United States Patent
Singh et al.

(10) Patent No.: US 9,713,306 B2
(45) Date of Patent: Jul. 25, 2017

(54) ELECTROHYDRAULIC CIRCUIT FOR A DROP FLOOR ASSEMBLY

(71) Applicant: CNH Industrial America LLC, New Holland, PA (US)

(72) Inventors: Chandrashekhar Singh, Aurangabad (IN); Dhananjay Wagh, Gujarat (IN); Srinivas Guttikar, Karnataka (IN); John McClure, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 100 days.

(21) Appl. No.: 14/734,583

(22) Filed: Jun. 9, 2015

(65) Prior Publication Data

US 2016/0360705 A1   Dec. 15, 2016

(51) Int. Cl.
| | |
|---|---|
| *A01F 15/07* | (2006.01) |
| *A01F 15/10* | (2006.01) |
| *F15B 21/08* | (2006.01) |

(52) U.S. Cl.
CPC ........... *A01F 15/106* (2013.01); *A01F 15/07* (2013.01); *A01F 15/10* (2013.01); *F15B 21/08* (2013.01); *A01F 2015/107* (2013.01); *F15B 2211/526* (2013.01); *F15B 2211/6306* (2013.01)

(58) Field of Classification Search
CPC .. A01D 41/1274; A01D 75/182; A01D 90/02; A01D 90/04; A01F 29/10; A01F 15/101; A01F 15/046; A01F 15/106; A01F 15/08; A01F 15/10; A01F 2015/102; A01F 2015/107; A01F 2015/108; A01F 15/07; F15B 21/08; F15B 2211/526; F15B 2211/6306

USPC ..... 56/10.2 R, 341, 364; 100/142, 178, 189; 460/6, 109
See application file for complete search history.

(56) References Cited

U.S. PATENT DOCUMENTS

| | | | |
|---|---|---|---|
| 3,709,284 A | | 1/1973 | Hunt |
| 4,862,684 A | * | 9/1989 | Naaktgeboren ....... A01F 15/101 100/189 |
| 4,962,632 A | * | 10/1990 | Schoonheere ........ A01F 15/101 100/142 |
| 6,112,507 A | | 9/2000 | Mesmer |
| 7,252,587 B2 | | 8/2007 | Viaud |
| 7,584,594 B2 | | 9/2009 | Viaud |
| 8,113,114 B2 | * | 2/2012 | Schlesser ........... A01D 41/1274 100/178 |
| 2012/0238335 A1 | | 9/2012 | Derscheid |
| 2013/0167498 A1 | | 7/2013 | Haycocks |

(Continued)

FOREIGN PATENT DOCUMENTS

| | | |
|---|---|---|
| DE | 102006036199 A1 | 2/2008 |
| FR | 2783130 A1 | 3/2000 |

OTHER PUBLICATIONS

Anonymous; "Naherungsschalter—Wikipedia", May 31, 2015, XP055309613, https://de.wikipedia.org/w/index.php?title=Naherungsschalter*oldid=142653693.

*Primary Examiner* — Robert Pezzuto
(74) *Attorney, Agent, or Firm* — Patrick M. Sheldrake (57) ABSTRACT

A crop feeding system for a harvester includes an electrohydraulic circuit comprising electric and hydraulic connections that allow for the movement of a bottom floor assembly, such movement defining the depth of a crop feeding channel in the harvester and allowing at least one variable setting for removing a clog of material in a crop collection channel.

22 Claims, 7 Drawing Sheets

(56) References Cited

U.S. PATENT DOCUMENTS

2013/0305683 A1  11/2013  Ziembicki
2013/0605683     11/2013  Ziembicki
2014/0021018 A1   1/2014  Biziorek

* cited by examiner

FIG. 7

ELECTROHYDRAULIC CIRCUIT FOR A DROP FLOOR ASSEMBLY

TECHNOLOGY FIELD

The present disclosure relates generally to a crop feeding system in a harvester, particularly to electric and hydraulic connections that allow for the movement of a bottom floor assembly, such movement defining the depth of a crop feeding channel in the harvester.

BACKGROUND

For many years harvesters, such as agricultural balers, have been used to consolidate and package crop material so as to facilitate the storage and handling of the crop material for later use. Usually, a mower-conditioner cuts and conditions the crop material for windrow drying in the sun. When the cut crop material is properly dried, a harvester, such as a round baler, the most frequently used in the industry, travels along the windrows to pick up the crop material and form it into cylindrically-shaped round bales.

More specifically, the cut crop material is gathered at the front of the baler from along the ground, onto a pickup assembly, and into a crop feeding channel where the material can be further cut before being introduced into a bale-forming chamber. Traditionally, the crop feeding channel is more narrow than the surrounding areas of the harvester, and clogging or plugging of the crop feeding channel is a common problem, especially if the harvester is being operated at higher speeds and thus passing greater amount of crop material through the crop feeding channel at a given time. Once a clog occurs, the harvester must be stopped for the crop feeding channel to be cleared, reducing harvesting efficiency.

One method to prevent clogging is to design a harvester with a limited amount of movement of the bottom floor of the crop feeding channel. The bottom floor physically supports the crop material as it passes through the crop feeding channel and is cut by a rotor and knives before being moved to the bale forming chamber. By allowing the bottom floor to move, it can temporarily increase the volume of crop material that can be passed through the crop feeding channel, possibly preventing the formation of a clog. The instant application provides an electrohydraulic circuit that allows for independent movement between the front and rear sections of a bottom floor of a crop feeding channel that prevents clogging of the feed channel due to occasional high crop material volume while still providing proper bale formation.

SUMMARY

The disclosure relates to an electrohydraulic circuit comprising: at least a first control panel; at least a first pressure sensor, set to at least a first pressure value and in electronic communication with the control panel; at least a first limit switch in electronic communication with the control panel; one or a plurality of supply controllers in electronic communication with the control panel, each supply controller configured to be independently activated; and one or a plurality of return controllers in electronic communication with the control panel, each return controller configured to be independently activated; wherein the at least first pressure sensor, upon detecting a pressure greater than the at least first pressure value, communicates with the control panel to activate at least one of the one or plurality of supply controllers and deactivate at least one of the one or plurality of return controllers. In some embodiments, the at least first limit switch, upon activation, communicates with the control panel to activate at least one of the return controllers and deactivate at least one of the one or plurality of supply controllers.

In some embodiments, the electrohydraulic circuit further comprises a source of pressurized fluid; and at least a first hydraulic cylinder comprising at least a first fluid opening on one end of the hydraulic cylinder, in fluid communication with the source of pressurized fluid, the one or plurality of supply controllers, and the one or plurality of return controllers; wherein, upon detecting a pressure greater than the at least first pressure value, the at least first pressure sensor sends a signal to the control panel to activate or to prompt an operator to active the least one of the one or plurality of supply controllers and deactivate at least one of the one or plurality of return controllers, allowing pressurized hydraulic fluid from the source of pressurized hydraulic fluid to enter into the at least first fluid opening; and wherein, upon activation by the at least first hydraulic cylinder, the at least first limit switch sends an electrical signal to the control panel to activate or to prompt an operator to activate at least one of the one or plurality of return controllers and deactivate at least one of the one or plurality of supply controllers, allowing pressurized hydraulic fluid from the source of pressurized hydraulic fluid to exit from the at least first fluid opening.

In some embodiments, the at least first cylinder is in operable communication with a bottom floor assembly, the bottom floor assembly comprising: a bottom floor frame comprising a first and a second frame wall and at least one face extending laterally across a top portion of the bottom floor assembly, such bottom floor frame positioned opposite and proximate to the feeder assembly; and one or a plurality of bottom floor plates, covering the at least one face and comprising a concave curvature that defines at least a portion of the bottom of the crop collection channel;

In some embodiments, the one or a plurality of bottom floor plates comprises a concave curvature extending over the entire width of the at least one face and define the entire bottom side of a crop collection channel.

In some embodiments, the electrohydraulic circuit comprises two hydraulic cylinders, each cylinder comprising at least a first fluid opening at or proximate to one end of the hydraulic cylinder, wherein each first fluid opening is in fluid communication with the source of pressurized fluid, the one or plurality of supply controllers, and the one or plurality of return controllers; and wherein each cylinder is in electrical communication with at least one pressure switch and at least one limit switch.

In some embodiments, the electrohydraulic circuit further comprises a solenoid in operable communication with the control panel and a pressure value, wherein the pressure valve is in fluid communication with the at least first hydraulic cylinder and the source of pressurized fluid, such that the pressure valve regulates the rate of fluid movement in the electrohydraulic circuit form or to the source of pressurized fluid.

In some embodiments, the electrohydraulic circuit is not in direct or indirect operable communication with a damper.

In some embodiments, the electrohydraulic circuit comprises four hydraulic cylinders, each cylinder comprising a first fluid opening in fluid communication with the source of the pressurized fluid and each cylinder in electrical communication with at least one pressure switch set with a first predetermined value and at least one limit switch, such that, upon detection of a pressure above the first predetermined value, the pressure switch activates movement of pressurized fluid in the electrohydraulic circuit to or from the at least first hydraulic cylinder thereby adjusting the length of the cylinder.

In some embodiments, upon triggering of the limit switch, the limit switch activates movement of pressurized fluid in the electrohydraulic circuit to or from the at least first hydraulic cylinder thereby adjusting the length of the cylinder.

In some embodiments, the electrohydraulic circuit comprises four hydraulic cylinders capable of synchronous or independent movement in response to pressure applied to the one or plurality of pressure switches.

In some embodiments, the four hydraulic cylinders are arranged as a first and a second pair of cylinders, such that each hydraulic cylinder in a pair is capable of synchronous movement. In some embodiments, a controller in any one of the disclosed electrohydraulic circuits allows an operator to engage a switch for each pair of hydraulic cylinders to be moved synchronously or independently.

Another aspect of the disclosure relates to a harvester comprising a harvester assembly comprising: an electrohydraulic circuit; a feeder assembly; a bottom floor assembly; and a crop collection channel positioned therebetween, such crop collection channel having a depth defined by the distance between the feeder assembly and the bottom floor assembly; wherein the feeder assembly comprises a rotor rotatable and positioned on a transverse axis between a first and a second sidewall, and a first pair of slotted guides oppositely positioned on the first and the second sidewalls; and wherein the feeder assembly optionally comprises at least one or a plurality of cutting implements positioned across at least a portion of the transverse axis between the first and the second sidewalls, such cutting implements configured for rotation on the axis during at least a first operational mode.

In some embodiments, the at least a first pair of hydraulic cylinders, set to a first predetermined amount of compression, provides a variable range of motion, thereby moving a front portion of the bottom floor assembly along the length of the first pair of slotted guides and adjusting the depth of the crop collection channel at the front portion of the at least one face during at least the first operational mode; and wherein the at least a second pair of hydraulic cylinders, set to a second predetermined amount of compression, provides a variable range of motion, thereby pivoting the bottom floor assembly at a pivot point positioned at the front portion of the bottom floor assembly and adjusting the depth of the crop collection channel at the rear-most section of the at least one face during at least the first operational mode.

In some embodiments, the motion of the first pair of hydraulic cylinders are synchronized to the motion of the second pair of hydraulic cylinders.

In some embodiments, the bottom floor assembly further comprises one or two connecting units at a pair of pivot points mechanically linked to the first pair of hydraulic cylinders.

In some embodiments, the at least a first pair of hydraulic cylinders comprises a first and a second cylinder capable of synchronous movement, such that, when a first predetermined amount of compression is applied to the first pair of hydraulic cylinders, the first and second cylinders move at about the same time within the variable range of motion of the first pair of hydraulic cylinders.

In some embodiments, the at least a first and a second pair of hydraulic cylinders are capable of synchronous movement, such that the first and second pair of hydraulic cylinders provide motion within their respective variable ranges at or about the same time.

In some embodiments, the harvester further comprises at least one cutting knife unit supported by the bottom floor frame; wherein the at least one cutting knife unit comprises at least one or a plurality of blades that passes through at least one or a plurality of slots in the bottom floor plate and at least partially protrude into the crop collection channel.

Another aspect of the disclosure relates to a method of adjusting the volume of a crop collection channel comprising: detecting, with at least a first pressure sensor, a pressure greater than at least a first pressure value; activating at least one of one or a plurality of supply controller and deactivating at least one of one or a plurality of return controllers; and extending at least a first hydraulic cylinder operably connected to a bottom floor assembly, wherein said extension moves the bottom floor assembly to increase the volume of the crop collection channel.

In some embodiments, the method of adjusting the volume of a crop collection channel further comprises activating at least a first limit switch; activating at least one of one or a plurality of return controllers and deactivating at least one of one or a plurality of supply controllers; and contracting at least a first hydraulic cylinder operably connected to the bottom floor assembly, wherein said contraction moves the bottom floor assembly in decrease the volume of the crop collection channel. In some embodiments, the at least a first limit switch is activated by the extension of the at least first hydraulic cylinder.

DETAILED DESCRIPTION OF THE DISCLOSURE

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "harvester" as used herein is defined as a machine that consolidates and/or packages material so as to facilitate the storage and handling of the material for later use. In some embodiments, the harvester is used to harvest agricultural material. In some embodiments, the harvester is an agricultural baler, a waste baler, or a combine comprising a baling mechanism. In some embodiments, the harvester is a round baler.

The term "material" as used herein is defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683, which is incorporated herein by reference in its entirety, that illustrates such mechanisms.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is defined by the position of one or more baling belts that wrap around a top portion of the crop material as its rotating in the bale chamber. In some embodiments, the baling belts are mounted on a series of rolls positioned above the bale chamber that exact tension on a the bale as it grows.

The term "bottom floor" or "bottom floor assembly" as used herein is defined as an element that defines one side or a section of one side of a crop collection channel. In some embodiments, the bottom floor assembly is positioned oppositely from a feeder assembly. In some embodiments, the bottom floor assembly is capable of movement, such movement causing changes in the depth of the crop collection channel. In some embodiments, the bottom floor assembly is positioned on the lower or bottom side of the crop collection channel. In some embodiments, the bottom floor assembly is positioned on the upper or top side of the crop collection channel. In some embodiments, the bottom floor assembly comprises at least a first pair of hydraulic cylinders, a bottom floor frame comprising a first and a second framewall and at least one face comprising a concave curvature and extending laterally across the bottom floor assembly, positioned opposite and proximate to the feeder assembly, and one or a plurality of bottom floor plates, covering the at least one face and defining a concave curvature of the crop collection channel.

The term "cutting implement" as used herein is defined as a device involved with the cutting of crop material, including one or a plurality of knives, blades, teeth, gears, grinders, scissors, or rotors. In some embodiments, the harvester assembly is equipped with a "rotor cutter" comprising a rotor, a plurality of knife blades attached to one or more knife units, components to support the knife units and allow for the insertion and removal of the knife units within the bottom floor assembly, and a slotted bottom floor through which the knife blades protrude. In some embodiments, the harvester assembly is equipped with a "rotor feeder" comprising a rotor and a solid bottom floor.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural harvesters, such as round balers, are well known in the agricultural industry, and the instant disclosure can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entireties. Embodiments of the present disclosure are particularly well suited, but in no way limited to, use with agricultural balers. The present disclosure may also find utility in agricultural harvesters including, for example, a round baler, a waste baler, a cotton harvester, or a combine. In some embodiments, the combine comprises a baling mechanism. Agricultural harvesters incorporating movable floor assemblies are disclosed in U.S. patent application Ser. No. 14/469,824, which is incorporated by reference in its entirety.

The present disclosure relates to a electrohydraulic circuit that controls the movement of a bottom floor assembly in a harvester. As crop material is picked up from the ground, it is fed through a crop collection channel for grinding and/or cutting before being fed into a baling chamber. Crop material present in the crop collection channel can place pressure on a bottom floor assembly, including the bottom floor plate and a series of hydraulic cylinders that creates the bottom of the crop collection channel. The bottom floor assembly is designed to allow the bottom floor to move downward during active operation of the harvester, allowing plugs or blockages of crop material to pass through the crop collection channel without the operator having to stop the harvester and manually remove the blockage. In some embodiments, when crop material present in the crop collection channel exerts enough pressure on the bottom floor assembly such that a front pair of hydraulic cylinders is under a set amount of pressure, a front pressure switch will activate the electrohydraulic circuit such that the front and/or rear pairs of hydraulic cylinders will lower the bottom floor in an attempt to clear the blockage. When crop material present in the crop collection channel exerts enough pressure of the bottom floor assembly such that a rear pair of hydraulic cylinders is under a set amount of pressure, a rear pressure switch will activate the electrohydraulic circuit such that only the rear pair of hydraulic cylinders will lower the rear of the bottom floor in an attempt to clear the blockage. After the pairs of hydraulic cylinders have reach a set travel length or a set time period has elapsed, the hydraulic cylinders will retract and the entire bottom floor assembly will return to its starting position. If one or more pressure sensors still detects a blockage, or if a blockage is detected at a subsequent time, the process will repeat.

In some embodiments, the electrohydraulic circuit comprises at least a first control panel; at least a first pressure sensor, set to at least a first pressure value and in electronic communication with the control panel; at least a first limit switch in electronic communication with the control panel; one or a plurality of supply controllers in electronic communication with the control panel, each supply controller configured to be independently activated; and one or a plurality of return controllers in electronic communication with the control panel, each return controller configured to be independently activated. The at least first pressure sensor, upon detecting a pressure greater than the at least first pressure value, communicates with the control panel to activate at least one of the one or plurality of supply controllers and deactivate at least one of the one or plurality of return controllers. The at least first limit switch, upon activation, communicates with the control panel to activate at least one of the one or plurality of return controllers and deactivate at least one of the one or plurality of supply controllers.

Figure 1:
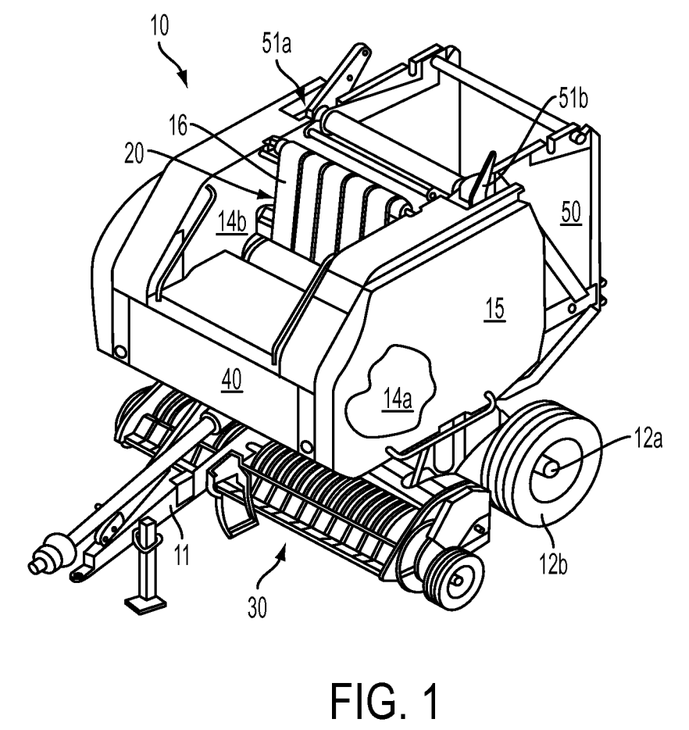
FIG. 1 depicts an embodiment of a round baler.

Referring to FIG. 1, a generally well-known round baler 10 is shown to include a main frame terminating forwardly in a tongue 11 and rearward slightly beyond a transverse axle 12a to which a pair of wheels 12b (only one shown) is mounted, thus forming a wheel supported main frame (not shown in detail). The main frame supports a series of belts 16 and floor rolls (not shown), which together with a first sidewall 14a (shown in the breakout) behind and generally parallel to cover panel 15 and a second sidewall 14b, collectively forming a bale-forming chamber 20. Cut crop material is picked up by transverse pickup 30 and fed through a harvesting assembly (shown in FIGS. 2, 3, and 4) into bale-forming chamber 20 where it is formed into a cylindrically shaped bale (not shown) by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground.

Figure 2:
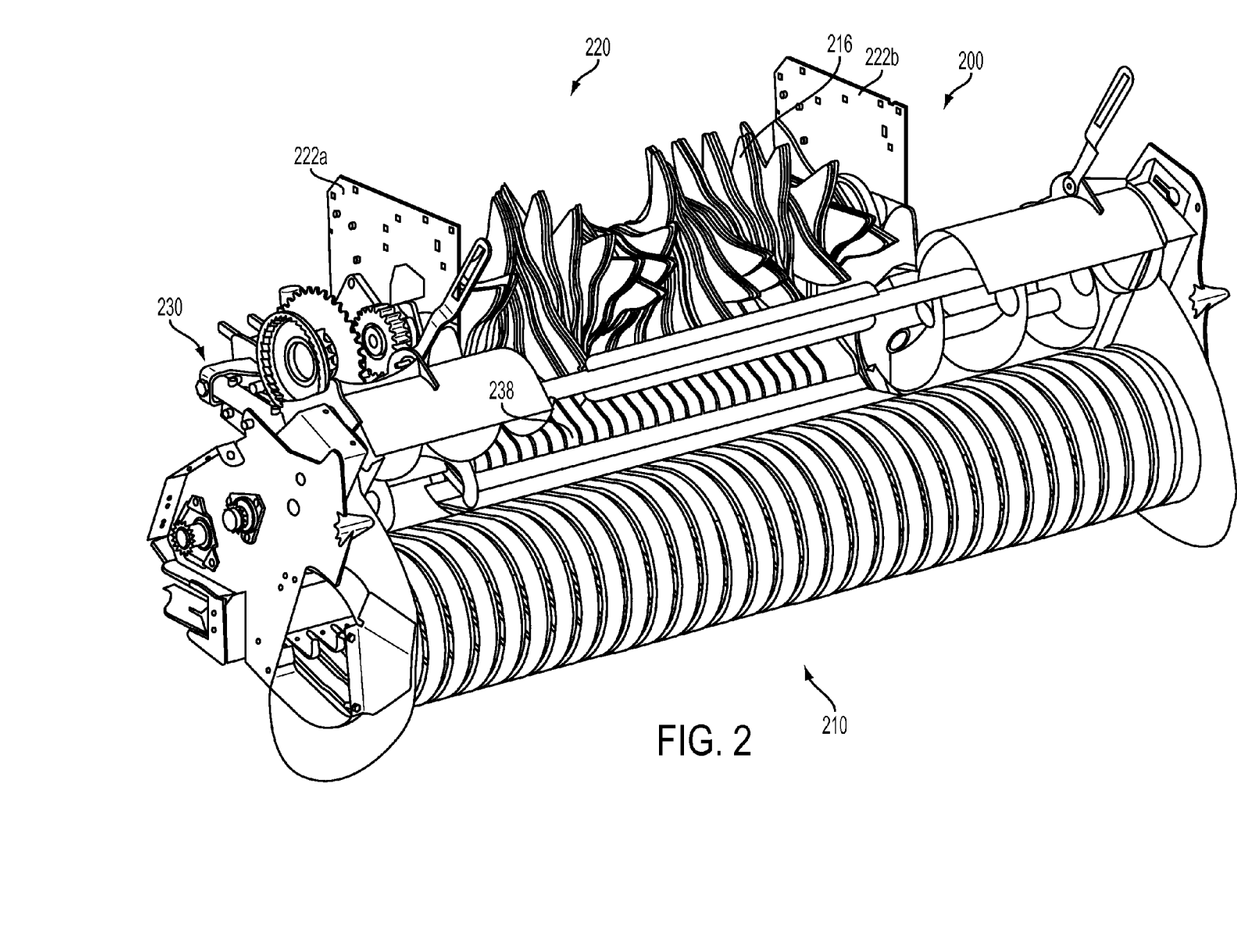
FIG. 2 depicts an embodiment of a harvesting assembly with a pickup, a feeder and a bottom floor assembly.
Figure 3:
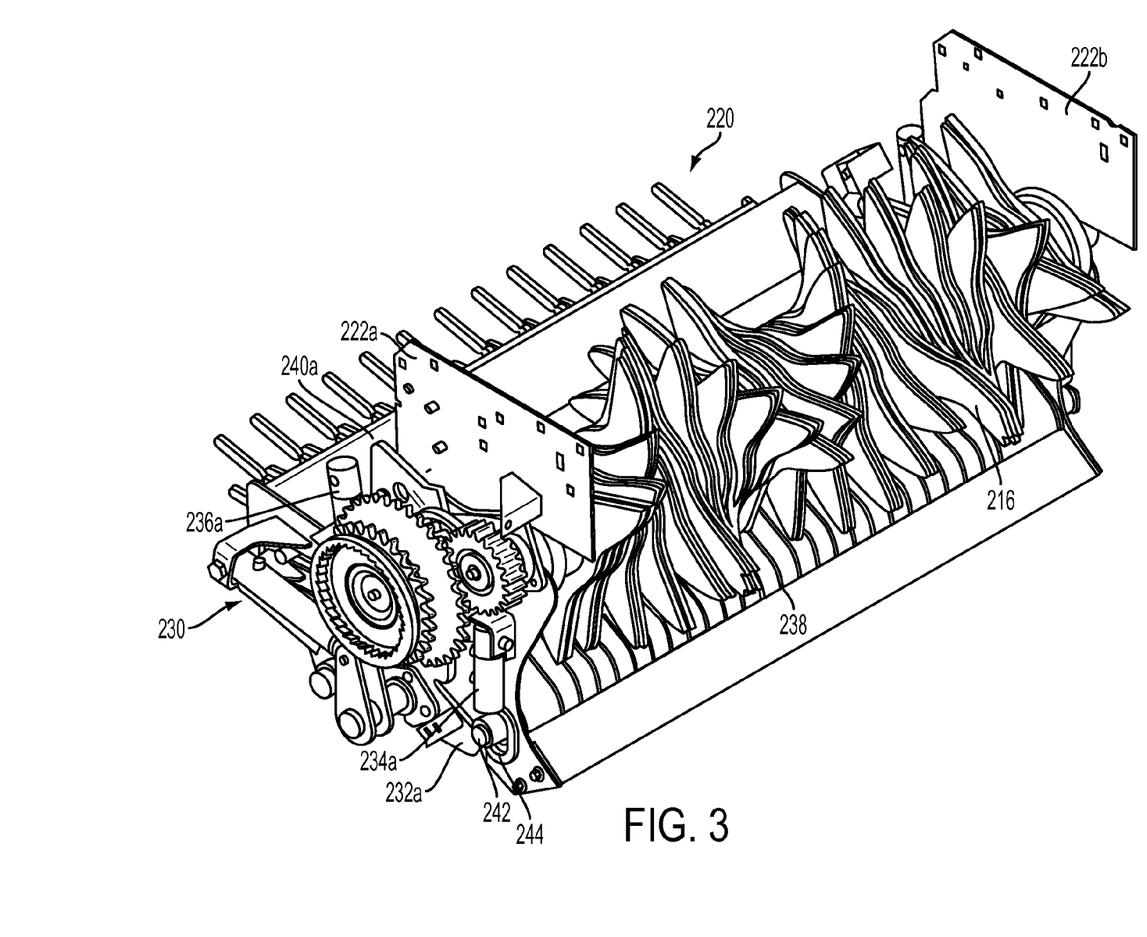
FIG. 3 depicts an embodiment of a harvesting assembly with a feeder and a bottom floor assembly.
Figure 4:
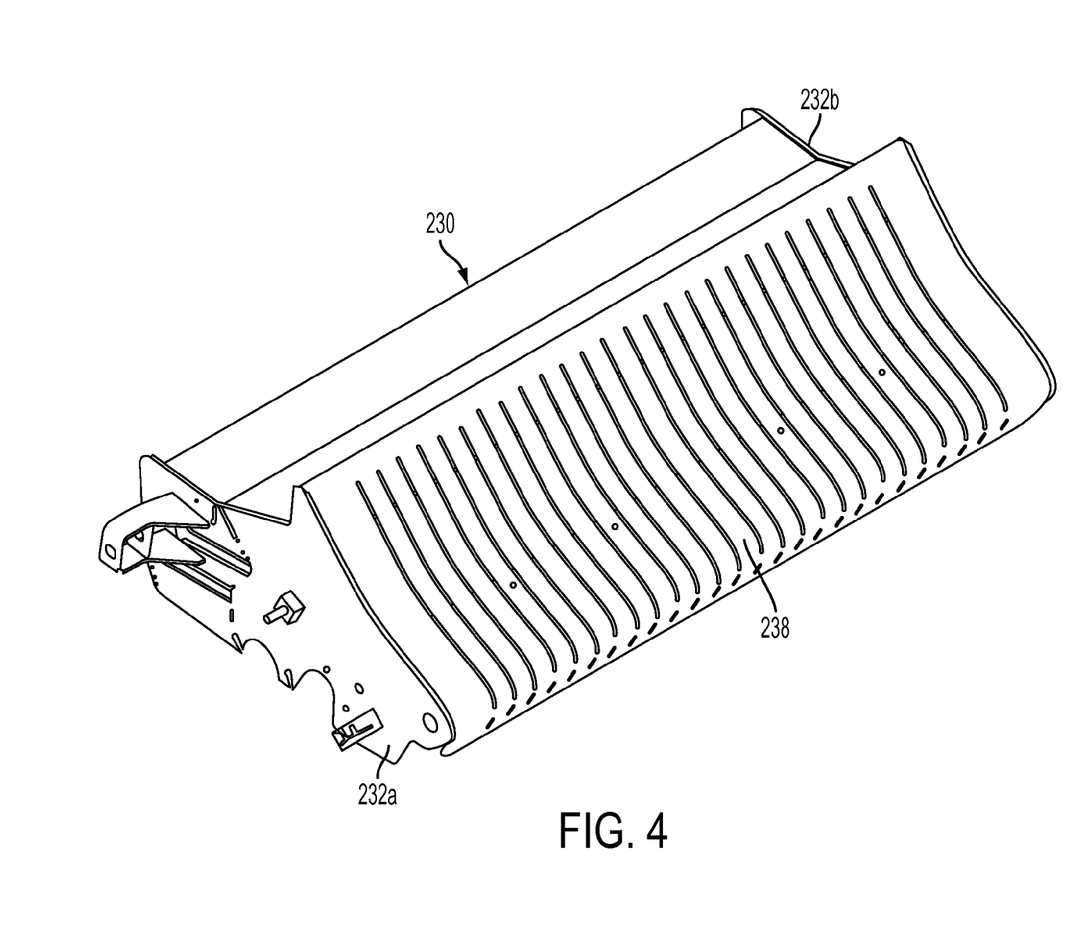
FIG. 4 depicts an embodiment of the bottom floor frame and a plate of the bottom floor assembly.

FIGS. 2, 3, and 4 depict an exemplary embodiment of a harvesting assembly with various parts and assemblies shown or removed for clarity. FIG. 2 depicts the harvesting assembly, generally designated 200, attached at its front end to a pick-up assembly 210. The pick-up assembly 210 picks crop material (which would enter from the bottom right in this orientation) off of the ground and passes it to the feeder assembly 220, which is defined by a pair of sidewalls 222a and 222b and a series of rotor blades 216. The rotor blades 216 feed the crop material into the crop collection channel defined as the space between the bottom floor plate 238 of the bottom floor assembly 230 and the rotor of the feeder assembly 220. The sidewalls 222a and 222b connect the harvesting assembly to the rest of the harvester.

FIG. 3 depicts the harvesting assembly 200 with the pick-up assembly removed. Shown more clearly is the feeder assembly 220 and the bottom floor assembly 230. The feeder assembly 220 comprises a pair of sidewalls 222a, 222b, between which a rotor (not shown) and a series of rotor blades 216 rotates along an axis. Towards a lower end of the pair of sidewalls 222a, 222b is a pair of slotted guides (only one of which, 244, is shown). The position of the slotted guides 244 define a series of movable vertical pivot points along a transverse axis between the pair of sidewalls 222a, 222b, the height of the slotted guides 244 permits movement of the pivot points across a distance that corresponds to the height of the slots. In the depicted embodiment, the pivot point of the bottom floor assembly is defined by the transverse axis 242. The bottom floor assembly 230 comprises a bottom floor frame 232, upon which is attached a first pair of hydraulic cylinders (only one of which, 234a, is shown), a second pair of hydraulic cylinders (only one of which, 236a, is shown), a bottom floor plate 238, and two cutting knife units (only one of which, 240a, is clearly seen). In the depicted embodiment, the bottom floor assembly 230 is configured for both linear movement both up and down the slotted guide 244 and for radial movement around the pivot point 242. The pivot point 242 is mechanically linked to the first pair of hydraulic cylinders 234 (only one of which, 234a, is shown).

FIG. 4 depicts the bottom floor assembly 230 with both pairs of hydraulic cylinders, and the two cutting knife units removed in an embodiment that can be adapted for use in a harvester. Remaining is the bottom floor frame 232a, 232b, and the bottom floor plate 238. A plurality of slots are clearly visible in the bottom floor plate 238 through which individual knives of the cutting knife units protrude. In some embodiments, if the bottom floor assembly is adapted for use in a harvester disclosed herein, the cutting knife units are capable of protruding into the crop collection channel. Also visible is the pivot point 242, whose axis runs the length of the bottom floor assembly. If this embodiment is configured to harvest crop material in a harvester, crop material, moved by a feeder assembly passes over the bottom floor plate 238 as it makes its way through the crop collection channel (defined as the space between the bottom floor plate 238 and the rotor of the feeder assembly 220) and into the harvester for baling.

Figure 5:
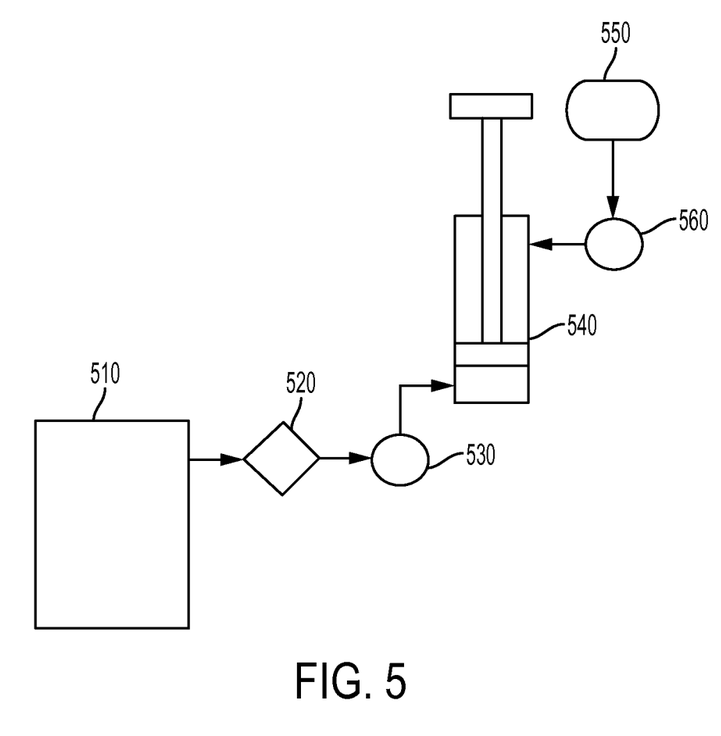
FIG. 5 depicts a flow diagram of an electrohydraulic circuit for a bottom floor assembly with one pair of hydraulic cylinders.
Figure 6:
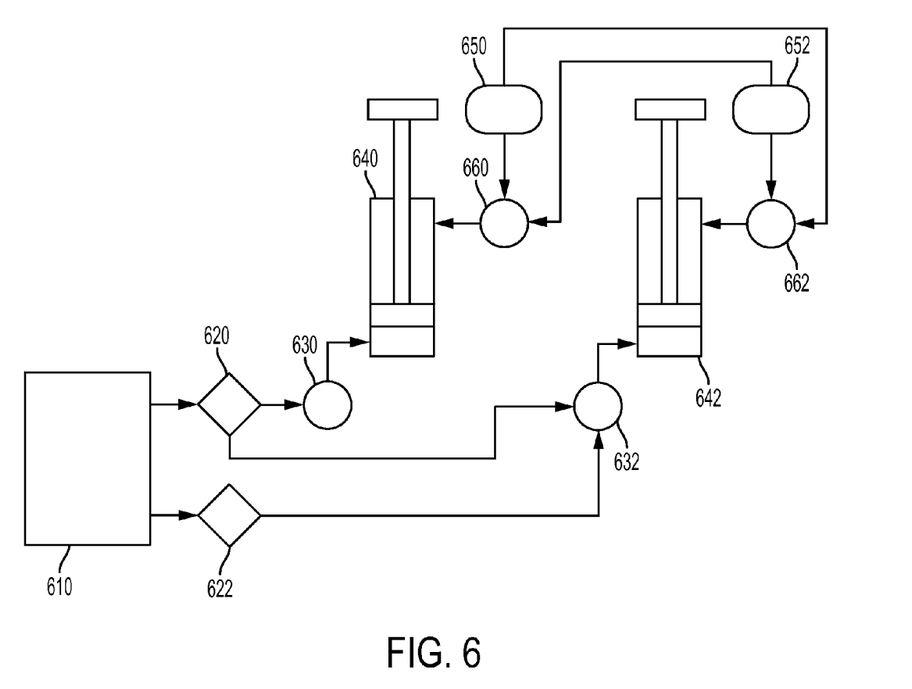
FIG. 6 depicts a flow diagram of an electrohydraulic circuit for a bottom floor assembly with two pairs of hydraulic cylinders.

FIGS. 5 and 6 depict embodiments in which electrohydraulic circuits control the movement of the hydraulic cylinders of a bottom floor assembly, for example, the harvester and bottom floor assembly depicted in FIGS. 1-4. In FIG. 5, a pressure sensor 520 is attached to a bottom floor assembly, generally labeled 510. When the pressure sensor 520 detects a pressure greater than a set pressure value, a supply controller 530 is activated, causing a hydraulic circuit to extend a hydraulic cylinder 540. In some embodiments, the hydraulic cylinder 540 represents a pair of hydraulic cylinders that attach the bottom floor assembly to a harvester frame. The physical extension of the hydraulic cylinder 540 can activate a limit switch 550, which in turn activates a return controller 560, causing the hydraulic circuit to, in this embodiment, retract the hydraulic cylinder 540. In some embodiments, the activation of the supply controller 530 also deactivates the return controller 560. In some embodiments, the activation of the return controller 560 also deactivates the supply controller 530.

In some embodiments, when the pressure sensor 520 activates the supply controller 530, the supply controller is activated is for a predetermined time period, set by an operator of harvester in which the electrohydraulic circuit operates. After the end of the predetermined time period, the supply controller 530 is deactivated and the return controller 560 is activated, even if the limit switch 550 is not activated. In some embodiments, the predetermined time period is from about 1 second to about 20 seconds. In some embodiments, the predetermined time period is from about 2 seconds to about 20 seconds. In some embodiments, the predetermined time period is from about 3 seconds to about 20 seconds. In some embodiments, the predetermined time period is from about 4 seconds to about 20 seconds. In some embodiments, the predetermined time period is from about 5 seconds to about 20 seconds. In some embodiments, the predetermined time period is from about 6 seconds to about 20 seconds. In some embodiments, the predetermined time period is from about 7 seconds to about 20 seconds. In some embodiments, the predetermined time period is from about 8 seconds to about 20 seconds. In some embodiments, the predetermined time period is from about 9 seconds to about 20 seconds. In some embodiments, the predetermined time period is from about 10 seconds to about 20 seconds. In some embodiments, the predetermined time period is from about 12 seconds to about 20 seconds. In some embodiments, the predetermined time period is from about 14 seconds to about 20 seconds. In some embodiments, the predetermined time period is from about 16 seconds to about 20 seconds. In some embodiments, the predetermined time period is from about 18 seconds to about 20 seconds. In some embodiments, the predetermined time period is from about 1 second to about 18 seconds. In some embodiments, the predetermined time period is from about 1 second to about 16 seconds. In some embodiments, the predetermined time period is from about 1 second to about 14 seconds. In some embodiments, the predetermined time period is from about 1 second to about 12 seconds. In some embodiments, the predetermined time period is from about 1 second to about 10 seconds. In some embodiments, the predetermined time period is from about 1 second to about 9 seconds. In some embodiments, the predetermined time period is from about 1 second to about 8 seconds. In some embodiments, the predetermined time period is from about 1 second to about 7 seconds. In some embodiments, the predetermined time period is from about 1 second to about 6 seconds. In some embodiments, the predetermined time period is from about 1 second to about 5 seconds. In some embodiments, the predetermined time period is from about 1 second to about 4 seconds. In some embodiments, the predetermined time period is from about 1 second to about 3 seconds. In some embodiments, the predetermined time period is from about 1 second to about 2 seconds. In some embodiments, the predetermined time period is from about 5 seconds to about 10 seconds. In some embodiments, the predetermined time period is no more than about 10 seconds, no more than about 15 second, or no more than about 20 seconds.

FIG. 6 depicts a hydraulic circuit that can be configured for operation in a harvester comprising a drop floor assembly described herein. In the depicted embodiment, a pair of hydraulic cylinders are mechanically connected to the drop floor such that extension of one hydraulic cylinder raises the front of the drop floor assembly and extension of the other hydraulic cylinder raises the rear of the drop floor assembly. Contraction of the cylinders causes the lowering of the drop floor assembly. In some embodiments, the front hydraulic cylinder 640 is a pair of hydraulic cylinders positioned proximate to each other or positioned on opposite sides of the front section of the drop floor assembly, connecting said drop floor assembly to a harvester frame. In some embodiments, the rear hydraulic cylinder 642 is a pair of hydraulic cylinders positioned proximate to each other or positioned on opposite sides of the rear section of the drop floor assembly, connecting said drop floor assembly to a harvester frame. In FIG. 6, two pressure sensors are attached to a bottom floor assembly 610, a front pressure sensor 620 and a rear pressure sensor 622. If the front pressure sensor 620 detects a pressure in the drop floor assembly 610 greater than a set or predetermined front pressure value, a front supply controller 630 and a rear supply controller 632 are both activated, causing a hydraulic circuit to extend a front hydraulic cylinder 640 and a rear hydraulic cylinder 642. When the rear pressure sensor 622 detects a pressure greater than a set rear pressure value, only the rear supply controller 632 is activated. Therefore, when the front pressure sensor 620 detects an excessive buildup of crop material, both the front and rear sections of the bottom floor are lowered in an attempt to remove the blockage. When the rear pressure sensor 622 detects an excessive buildup of crop material, only the rear section of the bottom floor is lowered.

The physical extension of the front hydraulic cylinder 640 can activate a front limit switch 650, which in turn activates both a front return controller 660 and a rear return controller 662 in this embodiment, causing the hydraulic circuit to retract both the front hydraulic cylinder 640 and the rear hydraulic cylinder 642. In some embodiments, the front limit switch 650 activates only the front return controller 660. Likewise, the physical extension of the rear hydraulic cylinder 642 can activate a rear limit switch 662, which in turn activates both a front return controller 660 and a rear return controller 662 in this embodiment, causing the hydraulic circuit to retract both the front hydraulic cylinder 640 and the rear hydraulic cylinder 642. In some embodiments, the rear limit switch 662 activates only the rear return controller 662. In some embodiments, the activation of the front supply controller 630 also deactivates the front return controller 660. In some embodiments, the activation of the rear supply controller 632 also deactivates the rear return controller 662. In some embodiments, the activation of the front return controller 660 also deactivates the front supply controller 630. In some embodiments, the activation of the rear return controller 662 also deactivates the rear supply controller 632.

In some embodiments, when the front pressure sensor 620 activates the front and rear supply controllers 630, 632 the activation is for a predetermined time period. After the end of the predetermined time period, the front and rear supply controllers 630, 632 are deactivated and the front and rear return controller 660, 662 are activated, even if neither the front nor rear limit switch 650, 652 is activated. In some embodiments, the predetermined time period is from about 1 second to about 20 seconds. In some embodiments, the predetermined time period is from about 2 seconds to about 20 seconds. In some embodiments, the predetermined time period is from about 3 seconds to about 20 seconds. In some embodiments, the predetermined time period is from about 4 seconds to about 20 seconds. In some embodiments, the predetermined time period is from about 5 seconds to about 20 seconds. In some embodiments, the predetermined time period is from about 6 seconds to about 20 seconds. In some embodiments, the predetermined time period is from about 7 seconds to about 20 seconds. In some embodiments, the predetermined time period is from about 8 seconds to about 20 seconds. In some embodiments, the predetermined time period is from about 9 seconds to about 20 seconds. In some embodiments, the predetermined time period is from about 10 seconds to about 20 seconds. In some embodiments, the predetermined time period is from about 12 seconds to about 20 seconds. In some embodiments, the predetermined time period is from about 14 seconds to about 20 seconds. In some embodiments, the predetermined time period is from about 16 seconds to about 20 seconds. In some embodiments, the predetermined time period is from about 18 seconds to about 20 seconds. In some embodiments, the predetermined time period is from about 1 second to about 18 seconds. In some embodiments, the predetermined time period is from about 1 second to about 16 seconds. In some embodiments, the predetermined time period is from about 1 second to about 14 seconds. In some embodiments, the predetermined time period is from about 1 second to about 12 seconds. In some embodiments, the predetermined time period is from about 1 second to about 10 seconds. In some embodiments, the predetermined time period is from about 1 second to about 9 seconds. In some embodiments, the predetermined time period is from about 1 second to about 8 seconds. In some embodiments, the predetermined time period is from about 1 second to about 7 seconds. In some embodiments, the predetermined time period is from about 1 second to about 6 seconds. In some embodiments, the predetermined time period is from about 1 second to about 5 seconds. In some embodiments, the predetermined time period is from about 1 second to about 4 seconds. In some embodiments, the predetermined time period is from about 1 second to about 3 seconds. In some embodiments, the predetermined time period is from about 1 second to about 2 seconds. In some embodiments, the predetermined time period is from about 5 seconds to about 10 seconds.

In some embodiments, when the rear pressure sensor 622 activates the rear supply controllers 632 the activation is for a predetermined time period. After the end of the time period, the rear supply controllers 632 is deactivated and the rear return controller 662 is activated, even if rear limit switch 652 is not activated. In some embodiments, the predetermined time period is from about 1 second to about 20 seconds. In some embodiments, the predetermined time period is from about 2 seconds to about 20 seconds. In some embodiments, the predetermined time period is from about 3 seconds to about 20 seconds. In some embodiments, the predetermined time period is from about 4 seconds to about 20 seconds. In some embodiments, the predetermined time period is from about 5 seconds to about 20 seconds. In some embodiments, the predetermined time period is from about 6 seconds to about 20 seconds. In some embodiments, the predetermined time period is from about 7 seconds to about 20 seconds. In some embodiments, the predetermined time period is from about 8 seconds to about 20 seconds. In some embodiments, the predetermined time period is from about 9 seconds to about 20 seconds. In some embodiments, the predetermined time period is from about 10 seconds to about 20 seconds. In some embodiments, the predetermined time period is from about 12 seconds to about 20 seconds. In some embodiments, the predetermined time period is from about 14 seconds to about 20 seconds. In some embodiments, the predetermined time period is from about 16 seconds to about 20 seconds. In some embodiments, the predetermined time period is from about 18 seconds to about 20 seconds. In some embodiments, the predetermined time period is from about 1 second to about 18 seconds. In some embodiments, the predetermined time period is from about 1 second to about 16 seconds. In some embodiments, the predetermined time period is from about 1 second to about 14 seconds. In some embodiments, the predetermined time period is from about 1 second to about 12 seconds. In some embodiments, the predetermined time period is from about 1 second to about 10 seconds. In some embodiments, the predetermined time period is from about 1 second to about 9 seconds. In some embodiments, the predetermined time period is from about 1 second to about 8 seconds. In some embodiments, the predetermined time period is from about 1 second to about 7 seconds. In some embodiments, the predetermined time period is from about 1 second to about 6 seconds. In some embodiments, the predetermined time period is from about 1 second to about 5 seconds. In some embodiments, the predetermined time period is from about 1 second to about 4 seconds. In some embodiments, the predetermined time period is from about 1 second to about 3 seconds. In some embodiments, the predetermined time period is from about 1 second to about 2 seconds. In some embodiments, the predetermined time period is from about 5 seconds to about 10 seconds.

Figure 7:
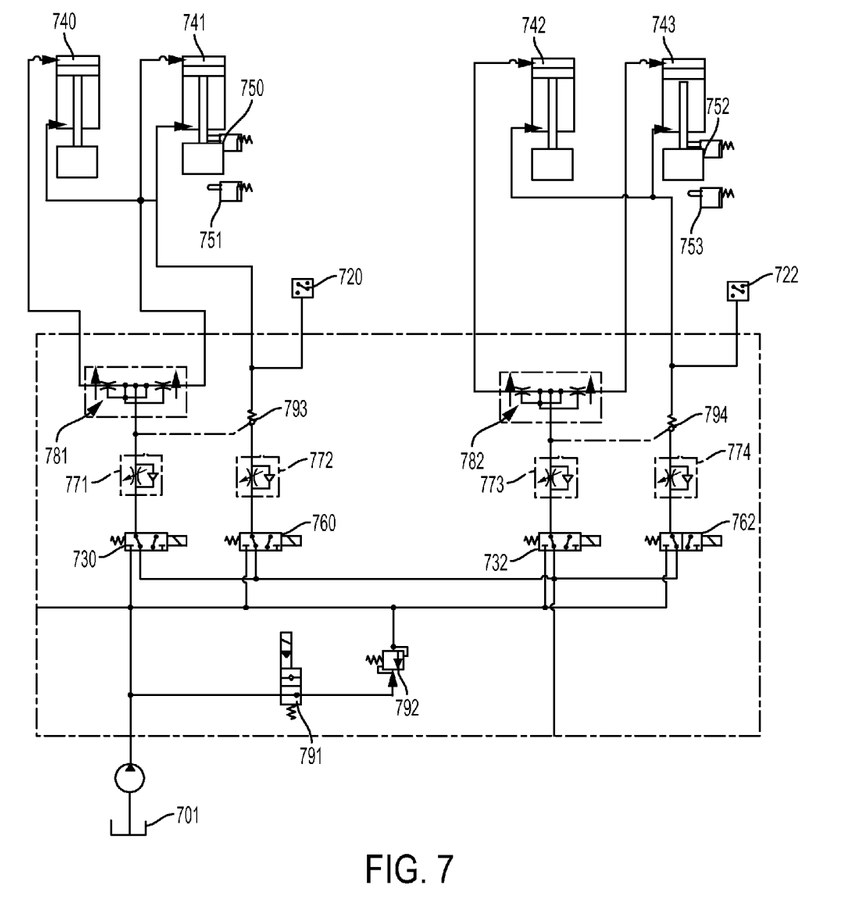
FIG. 7 depicts an electrohydraulic circuit for a bottom floor assembly.

FIG. 7 depicts a detailed example of an electrohydraulic circuit that controls the movement of two pairs of hydraulic cylinders configured mechanically linked and operably linked the bottom floor assembly and a harvester frame. Two pressure sensors, a front pressure sensor 720 and a rear pressure sensor 722, are connected to the hydraulic circuitry of the front hydraulic cylinders 740, 741 and rear hydraulic cylinders 742, 743, respectively. Each pressure sensor can detect changes in hydraulic pressure. When the front pressure sensor 720 detects a pressure greater than a set front pressure value, a front supply valve 730, and a rear supply valve 732 are activated, and the front return valve 760 and a rear return valve 762 are deactivated. This causes hydraulic fluid to flow from a fluid reservoir 701 through a front supply flow control valve 771 and a rear supply flow control valve 773, and then through a front flow divider 781 and a rear flow divider 782, before entering into the high (or extension) side of all four hydraulic cylinders 740, 741, 742, 743. Therefore, when the front pressure sensor 720 is activated, both the front and rear pair of hydraulic cylinders are extended in an attempt to clear the blockage that was exerting pressure on the front section bottom floor assembly.

When the rear pressure sensor 722 detects a pressure greater than a set rear pressure value, the rear supply valve 732 is activated and the rear return valve 762 is deactivated. This causes hydraulic fluid to flow from the fluid reservoir 701 through the rear supply flow control valve 773 and the rear flow divider 782 before entering into the high (or extension) side of the rear hydraulic cylinders only 742, 743. Therefore, when the rear pressure sensors 722 is activated, only the rear pair of hydraulic cylinders are extended in an attempt to clear the blockage that was putting pressure on the rear section of the bottom floor assembly.

In the depicted embodiment, the hydraulic cylinders 740, 741, 742, 743 can be returned to their starting lengths in two ways, manually activating one or more limit switches or when the a predetermined time period expires, such time period capable of being manually set by the operator before or during operation of the system. The physical extension of one or both front hydraulic cylinders 740, 741 can activate a front limit switch 751, activating in turn the front return valve 760 and the rear return valve 762, and deactivating the front and rear supply valves 730, 732. This causes hydraulic fluid to flow from the high (or extension) side of all four hydraulic cylinders 740, 741, 742, 743, back through the front and rear flow dividers 781, 782, and front and rear supply flow control valves 771, 773, and up through the front and rear return flow control valves 772, 774, front and rear check valves 793, 794, and into the low (or retraction) side of all four hydraulic cylinders 740, 741, 742, 743. The physical extension of one or both rear hydraulic cylinders 742, 743 can activate a rear limit switch 753, activating the rear return valve 762 and deactivating the rear supply valve 732. This causes hydraulic fluid to flow from the high (or extension) side of the rear hydraulic cylinders 742, 743, back through the rear flow divider 782 and rear supply flow control valve 773, and up through the rear return flow control valve 774, rear check valve 794, and into the low (or retraction) side of the rear hydraulic cylinders 742, 743.

The hydraulic cylinders 740, 741, 742, 743 will also be returned to their starting lengths after a set period of time. When either the front or rear supply valves 730, 732 are activated, after the set period of time has elapsed, any active supply valves are deactivated and the front and rear return valves are activated, causing the retraction of any extended hydraulic cylinder. In some embodiments, the time period is from about 1 second to about 20 seconds. In some embodiments, the time period is from about 2 seconds to about 20 seconds. In some embodiments, the time period is from about 3 seconds to about 20 seconds. In some embodiments, the time period is from about 4 seconds to about 20 seconds. In some embodiments, the time period is from about 5 seconds to about 20 seconds. In some embodiments, the time period is from about 6 seconds to about 20 seconds. In some embodiments, the time period is from about 7 seconds to about 20 seconds. In some embodiments, the time period is from about 8 seconds to about 20 seconds. In some embodiments, the time period is from about 9 seconds to about 20 seconds. In some embodiments, the time period is from about 10 seconds to about 20 seconds. In some embodiments, the time period is from about 12 seconds to about 20 seconds. In some embodiments, the time period is from about 14 seconds to about 20 seconds. In some embodiments, the time period is from about 16 seconds to about 20 seconds. In some embodiments, the time period is from about 18 seconds to about 20 seconds. In some embodiments, the time period is from about 1 second to about 18 seconds. In some embodiments, the time period is from about 1 second to about 16 seconds. In some embodiments, the time period is from about 1 second to about 14 seconds. In some embodiments, the time period is from about 1 second to about 12 seconds. In some embodiments, the time period is from about 1 second to about 10 seconds. In some embodiments, the time period is from about 1 second to about 9 seconds. In some embodiments, the time period is from about 1 second to about 8 seconds. In some embodiments, the time period is from about 1 second to about 7 seconds. In some embodiments, the time period is from about 1 second to about 6 seconds. In some embodiments, the time period is from about 1 second to about 5 seconds. In some embodiments, the time period is from about 1 second to about 4 seconds. In some embodiments, the time period is from about 1 second to about 3 seconds. In some embodiments, the time period is from about 1 second to about 2 seconds. In some embodiments, the time period is from about 5 seconds to about 10 seconds. After the predetermined time period has expired, if one or more of the pressure sensors still detects a hydraulic pressure over a set value, the hydraulic cylinders will once again be activated and the bottom floor will be lowered in an attempt to clear the blockage.

In some embodiments, the harvester and systems disclosed herein comprise a controller that operates and is in electronic communication with one or more valves and sensors that regulate fluid flow and pressure in a hydraulic circuit. In some embodiments, the hydraulic circuit is in fluid communication with pairs of hydraulic cylinders operably connected to a bottom floor assembly. In some embodiments, the hydraulic circuit is configured to adjust the position of the set of hydraulic cylinders, such that the bottom floor assembly moves between a first operational mode and a second operational mode.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications is incorporated by reference herein in its entirety.

What is claimed is:

1. An electrohydraulic circuit comprising:
   at least a first electronic control module;
   at least a first pressure sensor, set to at least a first pressure value and in electronic communication with the electronic control module;
   at least one switch in electronic communication with the electronic control module;
   at least one supply valve in electronic communication with the electronic control module, the at least one supply controller configured to be independently activated; and
   at least one return valve in electronic communication with the electronic control module, the at least one return valve configured to be independently activated;
   wherein the at least first pressure sensor, upon detecting a pressure greater than the first pressure value, communicates with the electronic control module to activate the at least one supply valve and deactivate at least one return valve.

2. The electrohydraulic circuit of claim 1, wherein the at least one switch, upon activation, communicates with the electronic control module to activate the at least one return valve and deactivate the at least one supply valve.

3. The electrohydraulic circuit of claim 1, further comprising:
   a source of pressurized fluid; and
   at least one cylinder comprising at least a first fluid opening on one end of the at least one cylinder, in fluid communication with the source of pressurized fluid, the at least one supply valve, and the at least one return valve;
   wherein, upon detecting a pressure greater than the first pressure value, the at least one first pressure sensor sends a signal to the electronic control module to activate or to prompt an operator to active the at least one supply valve and deactivate the at least one return valve, allowing pressurized fluid from the source of pressurized fluid to enter into the at least first fluid opening; and
   wherein, upon activation by the at least one cylinder, the at least one switch sends an electrical signal to the electronic control, module to activate or to prompt an operator to activate at least one of the at least one return valve and deactivate the at least one supply valve, allowing pressurized fluid from the source of pressurized fluid to exit from the at least first fluid opening.

4. The electrohydraulic circuit of claim 3, wherein the at least one cylinder is in operable communication with a bottom floor assembly, the bottom floor assembly comprising:
- a bottom floor frame comprising a first and a second frame wall and at least one face extending laterally across a top portion of the bottom floor assembly, said bottom floor frame positioned opposite and proximate to a feeder assembly; and
- at least one bottom floor plate, covering the at least one face and comprising a concave curvature that defines at least a portion of a bottom of a crop collection channel.

5. The electrohydraulic circuit of claim 4, wherein the at least one bottom floor plate extends over the entire width of the at least one face and define an entire bottom side of the crop collection channel.

6. The electrohydraulic circuit of claim 4, wherein the electrohydraulic circuit comprises two cylinders, each cylinder comprising at least a first fluid opening on one end of the cylinder, wherein each first fluid opening is in fluid communication with the source of pressurized fluid, the at least one supply valve, and the at least one return valve; and wherein each cylinder is in electrical communication with at least one pressure switch and the at least one switch.

7. The electrohydraulic circuit of claim 4, further comprising a solenoid in operable communication with the control panel and a pressure valve, wherein the pressure valve is in fluid communication with the at least first cylinder and the source of pressurized fluid, such that the pressure valve regulates a rate of fluid movement from or to the source of pressurized fluid.

8. The electrohydraulic circuit of claim 4, wherein the electrohydraulic circuit is not in direct or indirect operable communication with a damper.

9. The electrohydraulic circuit of claim 3, wherein the at least one cylinder comprises four cylinders, the at least a first fluid opening comprising separate-first fluid opening in each of the four cylinders in fluid communication with the source of the pressurized fluid and each cylinder in electrical communication with at least one pressure switch set with a first predetermined value and the at least one switch, such that, upon detection of a pressure above the first predetermined value, the pressure switch activates movement of pressurized fluid in the electrohydraulic circuit to or from thereby adjusting the length of at least a first cylinder of the four cylinders.

10. The electrohydraulic circuit of claim 9, wherein, upon triggering of the switch, the switch activates movement of pressurized fluid in the electrohydraulic circuit to or from the at least first cylinder.

11. The electrohydraulic circuit of claim 9, wherein the four cylinders are capable of synchronous or independent movement in response to pressure applied to the one or plurality of pressure switches.

12. The electrohydraulic circuit of claim 11, wherein the four cylinders are arranged as a first and a second pair of cylinders, such that each cylinder in a pair is capable of synchronous movement.

13. A harvester comprising a harvester assembly comprising:
- the electrohydraulic circuit of claim 1;
- a feeder assembly;
- a bottom floor assembly; and
- a crop collection channel positioned therebetween, such crop collection channel having a depth defined by the distance between the feeder assembly and the bottom floor assembly;
- wherein the feeder assembly comprises a rotor rotatable positioned on a transverse axis between a first and a second sidewall, and a first pair of slotted guides oppositely positioned on the first and the second sidewalls; and
- wherein the feeder assembly comprises at least one cutting implement positioned across at least a portion of the transverse axis between the first and the second sidewalls, such cutting implements configured for rotation on the transverse axis during at least a first operational mode.

14. The harvester of claim 13 further comprising
- a first pair of cylinders, operably linked to the bottom floor assembly, set to a first predetermined setting for providing a variable range of motion, thereby moving a front portion of the bottom floor assembly along a length of the first pair of slotted guides and adjusting the depth of the crop collection channel at the front portion of the at least one face during at least the first operational mode; and
- a second pair of cylinders, set to a second predetermined setting for providing a variable range of motion, thereby pivoting the bottom floor assembly at a first pivot positioned at the front portion of the bottom floor assembly and adjusting the depth of the crop collection channel at the rear-most section of the at least one face during at least the first operational mode.

15. The harvester of claim 14, wherein motion of the first pair of cylinders is synchronized to the motion of the second pair of cylinders.

16. The harvester of claim 14, wherein the bottom floor assembly further comprises at least one connecting unit at a pair of pivot points forming the first pivot mechanically linked to the first pair of cylinders.

17. The harvester of claim 14, wherein the first pair of cylinders comprises a first and a second cylinder capable of synchronous movement, such that, when a first predetermined pressure is applied to the first pair of cylinders, the motion of the first and second cylinders is timed with the variable range of motion of the second pair of cylinders.

18. The harvester of claim 14, wherein the first and second pair of cylinders are capable of synchronous movement within their respective variable ranges.

19. The harvester of claim 11 further comprising at least one cutting knife unit supported by the bottom floor frame; wherein the at least one cutting knife unit comprises at least one blade that passes through a corresponding at least one slot in the bottom floor plate and at least partially protrude into the crop collection channel.

20. A method of adjusting the volume of a crop collection channel comprising:
- detecting, with at least a first pressure sensor, a pressure greater than a first pressure value;
- activating at least one supply valve and deactivating at least one return valve; and
- extending at least a first cylinder operably connected to a bottom floor assembly, wherein said extension moves the bottom floor assembly to increase the volume of the crop collection channel.

21. The method of adjusting the volume of a crop collection channel of claim 20, further comprising:
- activating at least a first switch;
- activating at least one of one return valve and deactivating at least one supply valve; and
- contracting at least a first cylinder operably connected to the bottom floor assembly, wherein said contraction moves the bottom floor assembly to decrease the volume of the crop collection channel.

22. The method of adjusting the volume of a crop collection channel of claim 21, wherein the at least one switch is activated by the extension of the at least first cylinder.

* * * * *